United States Patent [19]

He

[11] Patent Number: 5,841,852

[45] Date of Patent: Nov. 24, 1998

[54] METHOD AND SYSTEM FOR TELECOMMUNICATIONS LANGUAGE SUPPORT

[75] Inventor: Jingsha He, Plano, Tex.

[73] Assignee: MCI Communications Corporation, Washington, D.C.

[21] Appl. No.: 581,725

[22] Filed: Dec. 29, 1995

[51] Int. Cl.⁶ .................................................. H04M 3/00
[52] U.S. Cl. ..................... 379/201; 379/246; 379/207; 379/265
[58] Field of Search ............................. 379/265, 266, 379/309, 67, 88, 201, 246, 207

[56] References Cited

U.S. PATENT DOCUMENTS

| | | | |
|---|---|---|---|
| 4,866,763 | 9/1989 | Cooper et al. | 379/221 |
| 5,046,088 | 9/1991 | Margulies | 379/265 |
| 5,309,505 | 5/1994 | Szlam et al. | 379/265 |
| 5,440,615 | 8/1995 | Caccuro et al. | 379/207 |
| 5,592,543 | 1/1997 | Smith et al. | 379/309 |
| 5,594,791 | 1/1997 | Szlam et al. | 379/265 |

FOREIGN PATENT DOCUMENTS

| | | |
|---|---|---|
| 0 574 147 A1 | 12/1993 | European Pat. Off. . |
| 0 654 930 A1 | 5/1995 | European Pat. Off. . |
| 44 30 991 A1 | 3/1996 | Germany . |
| 94/15309 | 7/1994 | WIPO . |
| 95/20859 | 8/1995 | WIPO . |
| 96/09710 | 3/1996 | WIPO . |

*Primary Examiner*—Ahmad F. Matar

[57] ABSTRACT

Provided is a method and system for telecommunications language support. A telephone user is enabled to specify a language preference for telephone calls through an account language preference field or with telephone commands from a telephone. In accordance with the telephone user's language preference, operators and automated telephone services appropriately serve the telephone user in the appropriate language should the telephone user need assistance. Audible messages, which are played to a telephone user in the event of a connection error, are played according to the telephone user's language preference.

14 Claims, 8 Drawing Sheets

NLS CODE 1:

| ERROR CODE | MESSAGE |
|---|---|
| 0101x | "YOUR CALL CANNOT BE COMPLETED AS DIALED. PLEASE HANG UP AND TRY AGAIN." |
| 01BFx | "THE NUMBER YOU HAVE DIALED IS DISCONNECTED OR IS NO LONGER IN SERVICE." |
| ... | ... |
| FFDEx | "THE NUMBER YOU HAVE DIALED DOES NOT REQUIRE A 1, PLEASE HANG UP AND TRY AGAIN." |

•
•
•

NLS CODE i:

| ERROR CODE | MESSAGE |
|---|---|
| 0101x | "SÚ LLAMADA NO PUDO SER COMPLETADO EN LA FORMA EN QUE ÚSTED MARCO. POR FAVOR CONSULTE EL NÚMERO Y MARQUE NUEVAMENTE." |
| 01BFx | "EL NÚMERO QUE ÚSTED MARCO ESTA DESCONECTADO O NO ESTA EN SERVICIO." |
| ... | ... |
| FFDEx | "EL NÚMERO QUE ÚSTED MARCO NO REQUIERE EL NUMERO UNO. POR FAVOR CULGE Y MARQUE NUEVAMENTE." |

•
•
•

NLS CODE N:

| ERROR CODE | MESSAGE |
|---|---|
| 0101x | ... |
| 01BFx | ... |
| ... | ... |
| FFDEx | ... |

FIG.4

METHOD AND SYSTEM FOR TELECOMMUNICATIONS LANGUAGE SUPPORT

TECHNICAL FIELD OF THE INVENTION

The present invention relates in general to telecommunication systems, and in particular, to a method and system for telecommunications language support. Still more particularly, the present invention relates to a method and system for interfacing to a telephone user in accordance with the language used by, or preferred by, the telephone user.

BACKGROUND OF THE INVENTION

People have at least one spoken language they are comfortable with using when conversing with other people. Telephone users prefer to talk to other telephone users who speak and understand the same language. Many times a telephone user would like to talk to a telephone operator but the telephone operator does not speak the language of the telephone user. For example, an immigrant to the United States from a foreign country may not speak or understand the English language. In the event the non-English speaking immigrant speaks to an operator who only speaks English, the immigrant will be unable to get help from the operator. A telephone user may also interface to an automated phone service with voice instructions. The service may not use a language familiar to the telephone user. For example, there are many Spanish speaking immigrants in southern parts of the United States. Some businesses located in this region provide bilingual Out Going Messages (OGMs) on their answer machines, as well as bilingual automated services to accommodate different language customers. There are many people who live in the United States who prefer speaking in a language other than English and these people need telephone service.

Another problem exists when a telephone user is unable to successfully complete a call. Any resulting error message recording played to the telephone user may not be in a comprehensible language.

Telephone services are not well adapted for the plurality of languages used by the many telephone users of that telephone service. Furthermore, as phone company services permeate the global market, it is clear that international language support is needed for telephone networks and services.

SUMMARY OF THE INVENTION

The present invention provides a Language Support or Natural Language Support (NLS) telephone system wherein a user friendly telephone service interfaces to a telephone user in accordance with the language used by, or preferred by, the user. When a telephone user desires help from a telephone operator (or telephone operator service), the user is automatically routed to an operator who (or operator service that) speaks a language selected by the user. Also, all telephone error messages are presented to a telephone user in a language which is selected by the user.

It is therefore one objective of the present invention to provide NLS in a telephone network.

It is an objective of the present invention to provide operator assistance and automated telephone services in a language which is preferred by a particular telephone user.

It is another objective of the present invention to provide telephone network error messages in a language which is preferred by a particular telephone user.

It is an objective of the present invention to enable NLS functionality at an End Office (EO) which provides dial tone to customers.

It is a further objective of the present invention to enable NLS functionality at an Interexchange Carrier (IXC) switch which provides long distance services.

It is another objective of the present invention to enable an integration of NLS functionality between an EO and IXC system through coexistence of cooperating telephone user preference profiles. The IXC profile can be used to override the EO preference at the appropriate time.

It is an objective of the present invention to enable a telephone user to set up a profile one time which will allow desirable NLS functionality thereafter.

It is another objective of the present invention to enable a user for specifying a language preference for any phone call at the time of making the phone call.

It is a further objective of the present invention to appropriately serve a plurality of users speaking different languages at any particular telephone.

It is yet another objective of the present invention to enable a user with a calling card to have a satisfied language preference from an arbitrary telephone.

The foregoing objectives are achieved as is now described. A method and system are disclosed for telecommunications NLS. The present invention allows telephone users to utilize a telephone in an optimal manner. Every telephone user in a telephone network is provided with telephone service that automatically adapts to the language preference of the user.

The above features and advantages of the present invention will become apparent to a person of ordinary skill in the field of the invention in view of the drawings and following detailed written description.

BRIEF DESCRIPTION OF DRAWINGS

FIG. 4 depicts a set of NLS database tables, wherein each table corresponds to a particular NLS language code, and the records within each table provide a mapping of telephone network error codes to corresponding language dependent error messages;

DETAILED DESCRIPTION OF THE INVENTION

Figure 1:
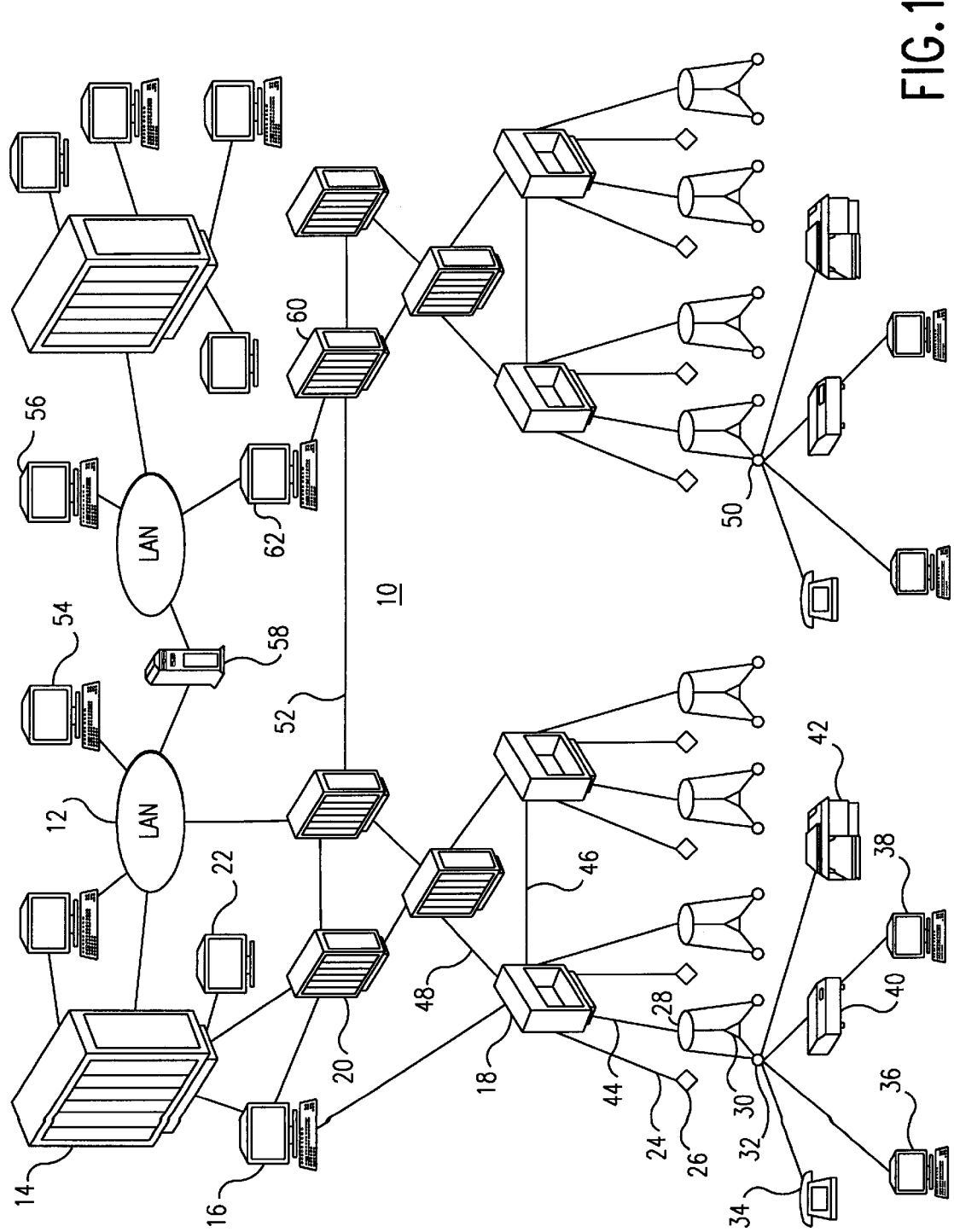
FIG. 1 is a pictorial representation of a telecommunications network in which the present invention may be utilized.

With reference now to the figures, and in particular with reference to FIG. 1, a telecommunications network 10 is depicted. Identical or similar icons and shapes in the figure represent identical or similar types of systems. The telecommunications network 10 may be integrated with Local Area Networks (LANs) including Local Area Network (LAN) 12, mainframe systems including mainframe 14, personal computers (PCs) including personal computer (PC) 16, varieties of telecommunications digital cross connect (DXC) switches including class 3 switch 18 and class 1 switch 20, dumb terminals (DTs) such as Dumb Terminal (DT) 22, and varieties of other systems, often referred to as nodes in the network.

The term network, as used herein, refers to a collection of two or more nodes linked together with communications functionality. Any node subset of FIG. 1, including two or more nodes which can communicate with each other, is also a network. The FIG. 1 telecommunications network may also be a subset of a larger network.

Lines shown between nodes in FIG. 1 demonstrate communications paths, links or spans. For example, a Direct Access Line (DAL) span 24 is at least one trunk between switch 18 and a directly connected customer Private Branch Exchange (PBX) 26. Point of Presence (POP) 28 is connected to a Local Tandem 30 and an End Office 32. The End Office (EO) 32 is the Local Exchange Company (LEC) switching center which provides dial tone and local service to end users. End users use equipment such as a telephone 34, an internal modem connected PC 36, a PC 38 which is connected with an external modem 40, a fax machine 42, or other communication devices, such as wireless devices. Telephone use refers to using any equipment connected to a telephone line or cellular telephone connection.

Spans 44, 46 and 48 include at least a single trunk. An end user of EO 50 is able to communicate with an end user of EO 32 through a single circuit by way of span 52. EO 50 and EO 32 may be great distances from each other. Spans 52, 46 and 48 could be accomplished through use of microwaves, satellites, or optical fibers. A telephone network, such as that which is shown in FIG. 1, is typically interconnected with other systems such as PC 16 or mainframe 14. These systems may be interconnected with LAN cables, telephone wires, wireless radio waves, or the like. Many varieties of protocols are available over these mediums. They are interconnected to facilitate network management through applications implemented thereon. PC 16 may be enabled for direct communications with a host mainframe 14, a switch 18, a switch 20, a DT 22 through mainframe 14, a LAN connected PC 54, a remote LAN PC 56 by way of a server bridge 58, or a switch 60 by way of a gateway server PC 62. Users at any system of FIG. 1 may communicate with users at any other system in FIG. 1 by way of a communications path well known to those skilled in the art.

Data for the telecommunications network is typically maintained at a switch, PC, mainframe, or any combination of these systems. Data storage devices associated with these systems store the data. A telecommunications network or system may be embodied over more than a single entity of hardware. A telecommunications system may be embodied as a single system or as a coordinated and integrated implementation across many systems including switches, PCs and mainframes, as shown in FIG. 1.

Figure 2:
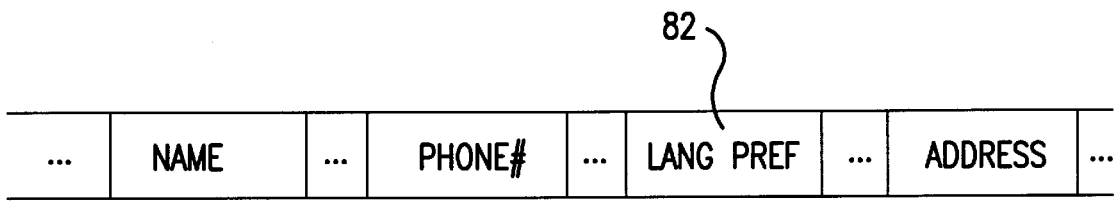
FIG. 2 depicts the format of a record which will appear in a database administrated by a telephone company when performing registration of a new telephone user.

With reference now to FIG. 2, a high level embodiment for the format of a record which will appear in a database administrated by a telephone company when performing registration of a new telephone user is shown. Upon recording a new account for a new telephone user, a user account record is created in any of a number of known databases for the purpose of telephone accounting. This record may be subsequently updated at any time and is referred to as a customer record. An IXC customer as well as an EO customer will have various customer information associated to the customer in the record. In reference to the present invention, the record will contain at least a language preference field 82 among any of a number of other fields maintained for any particular telephone user. The language preference field 82 contains a value defining a language preference indicator which denotes the NLS code of a particular language the telephone user prefers. For example, the language preference field 82 may be defined as hexadecimal values:

01x=English
02x=German
03x=French
04x=Spanish
05x=Italian

In the preferred embodiment, the language preference field 82 will correlate with system language definitions of the operating system upon which the present invention is associated. For example, operating systems such as IBM OS/2 (IBM and OS/2 are trademarks of International Business Machines Corporation), Microsoft DOS or Microsoft Windows (Microsoft and Windows are trademarks of Microsoft Corporation), which define languages with country codes, code pages, language identifiers, or the like, offer a well defined strategy for the language preference field 82. The language preference field 82 will be of appropriate size, for example in bytes, to accommodate defining the supported languages.

Figure 3:
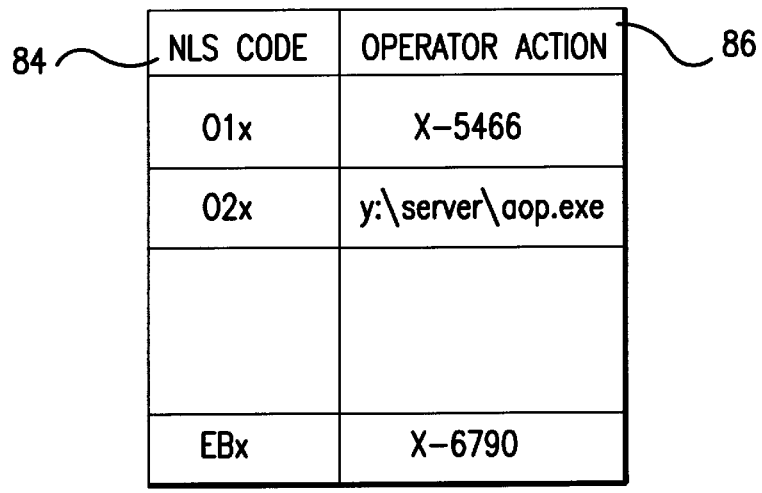
FIG. 3 depicts an NLS database table which provides a mapping of operator actions to a particular NLS code for a language.

With reference now to FIG. 3, depicted is an Operator Service Map Table (OSMT) which provides a mapping of operator services to a particular NLS code for a language. The table consists of at least two columns, an NLS code column 84 and an Operator Action column 86. The OSMT preferably defines an entry for every valid value which may appear in the language preference field 82 of a customer record. The NLS Code column 84 contains a value which is valid in the language preference field 82. The Operator Action column 86 contains a directive for appropriate routing of all telephone calls which have a language preference indicator equivalent to the corresponding value in the NLS code column 84. For example, the hexadecimal value 01x is the NLS code for English. As shown by FIG. 3, all telephone calls from customers with a language preference indicator of English will be automatically routed to the English speaking operator at extension 5466 of operator services. In another example of FIG. 3, wherein the NLS code is 02x which denotes German, all telephone calls from customers with a language preference indicator of German will be routed to the German version of an automated operator service. Thus, values in the Operator Action column 86 may be full telephone numbers, telephone extensions of a well known switch, program execution path references, or any other type of directive now known or later developed for routing a telephone call. Rows in the OSMT are preferably sorted by NLS code value to allow optimized searches (e.g., binary search) of the rows. There is a defaulted operator action for fruitless searches to the table.

With reference now to FIG. 4, depicted are NLS database tables, or an NLS Message Matrix (NMMAX), in the form of a comprehensible table format. The NMMAX defines a logical three dimensional array, wherein the outermost variant is the particular NLS code corresponding to valid values which may appear in the language preference field 82, the mid-variant is a particular error code which may occur as the result of an unsuccessful telephone call, and the innermost variant is an actual NLS message.

Thus, for each NLS code or NLS language code, there is a list of telephone error codes, and for each of the error codes, there is an NLS message. The NMMAX allows tailored messages for each type of error code and for each language in a telephone network. For example, if a first telephone user with a language preference indicator of English calls a second telephone user who has moved locations and had the telephone number disconnected, the first telephone user would encounter an error code of 01BF hexadecimal. Thus, the error message 92 from outermost variant table 94 would be played to the first telephone user. In another example, if a first telephone user with a language preference indicator of Spanish calls a second telephone user and incorrectly dials, the first telephone user would encounter an error code of 0101 hexadecimal. Thus, the error message 96 from outermost variant table 98 would be played to the first telephone user.

The outermost variant for language is characterized by individual tables, such as table 94 and table 98. Error codes associated with automated messages to a telephone user are represented by the mid-variant which is embodied by the Error Code column of each table. The innermost variant, embodied by the Message column of each table, may be a prerecorded message, a wave file reference, text for a subsequent text to speech process, a program reference for execution, or any other means of causing a message to be generated for a connected telephone user. Messages are sorted using the outermost variant and mid-variant as keys to enable optimized searches for the messages. For any error code which cannot be mapped in the NMMAX, a default message is provided.

Turning now to the flowcharts of FIG. 5 through FIGS. 8 and 8A, processing for the present invention is shown. It should be apparent to those skilled in the art that the user interface of the depicted process are not essential to the understanding of the invention, may vary without departing from the spirit and scope of the invention, and are therefore not detailed. Furthermore, so as to not obfuscate more important steps, certain obvious processes, such as obvious error handling steps, have not been shown in the flowcharts.

Figure 5:
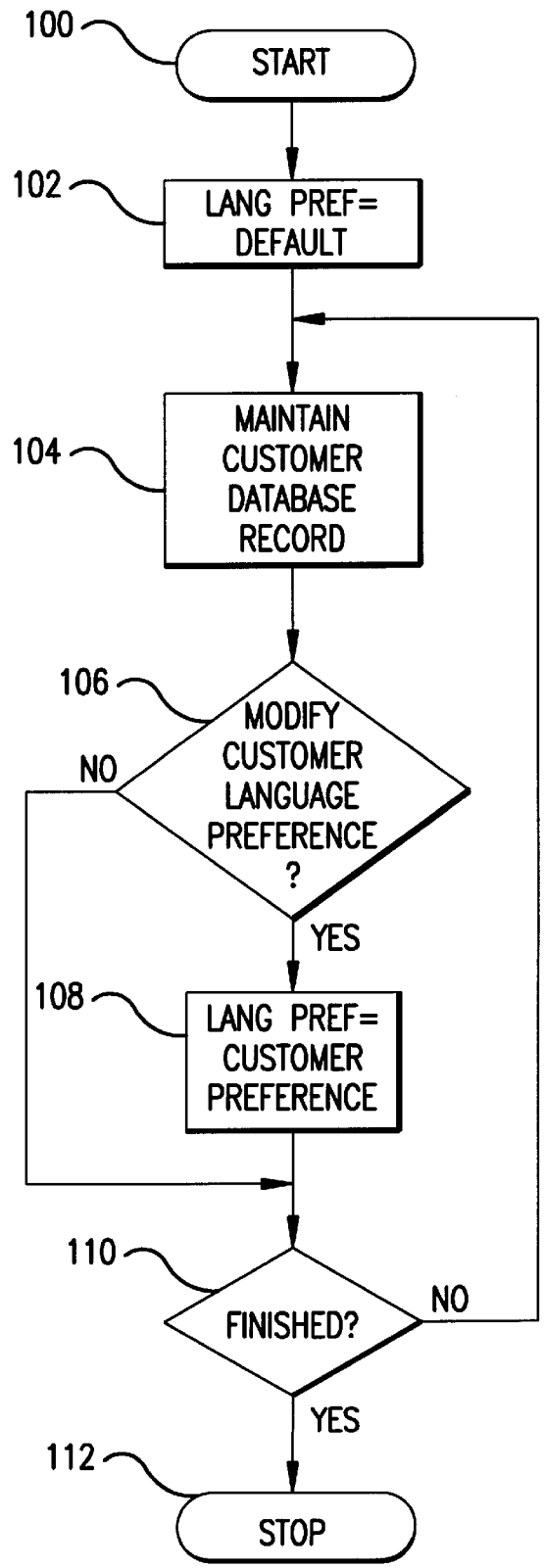
FIG. 5 is a flowchart depicting the user registration aspect of the present invention.

With reference now to FIG. 5, depicted is a flowchart demonstrating the user registration aspect of the present invention. FIG. 5 maintains data for records such as those shown in FIG. 2. The term "maintains", as utilized herein, means to perform modifications such as modify, delete, add, view, display, etc. The process starts in block 100 as the result of a service provider accepting customer account information. In effect, block 100 represents creation of a new customer record or the update of an existing customer record. Block 100 proceeds to block 102 where the language preference field is defaulted. In the case of creating a new customer record, a default language preference indicator is automatically set in the customer record. For example, in the United States, a default of English is set. In the case of an existing customer record, the default is already preset as the value which appears in the customer record. Block 102 flows to block 104 where the customer record is maintained with new or altered data. Block 104 flows to block 106 where a decision is made for altering a language preference field. If in block 106, the language preference field is to be modified, block 108 sets the value to the customer preference in the customer record as depicted in FIG. 2. Block 108 then proceeds to block 110. If in block 110, all customer record modifications are complete, the process terminates in block 112. If in block 110, the customer record modifications are not complete, block 110 continues back to block 104 for additional maintaining of the customer record. Referring back to block 106, if the language preference field did not require modification, block 106 flows to block 110 for processing previously described.

Figure 6:
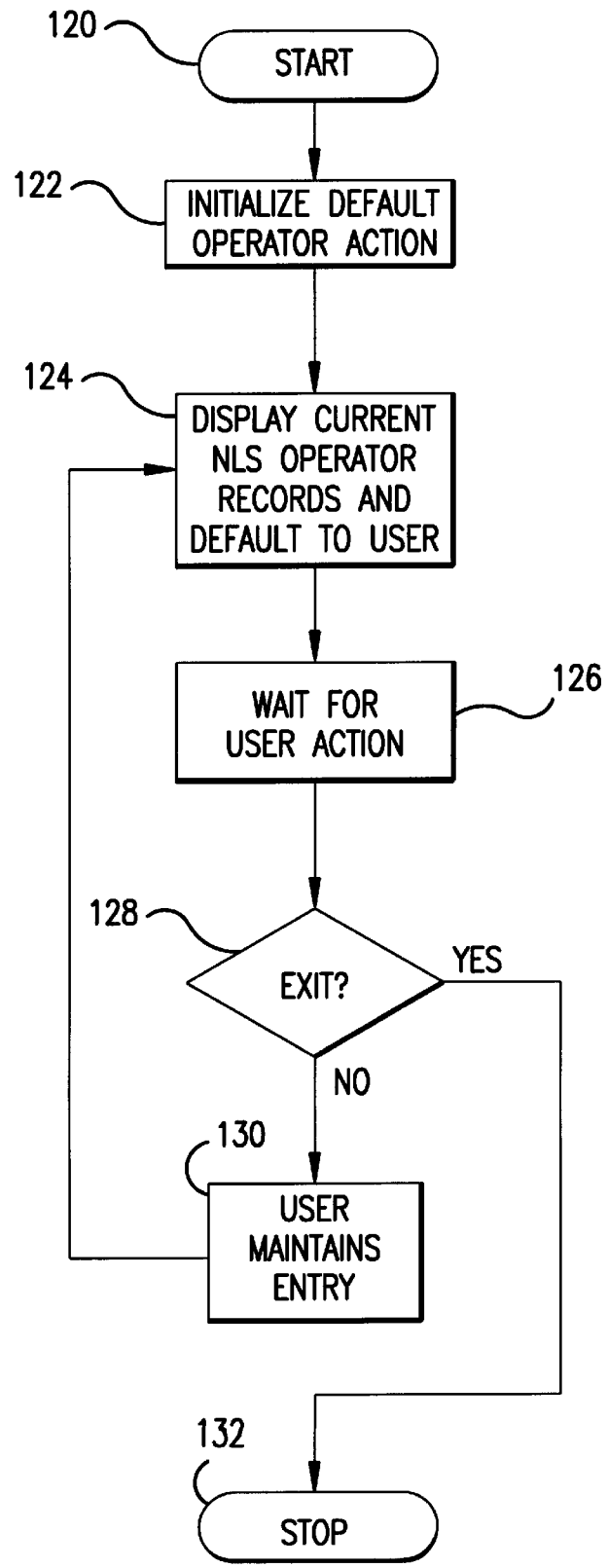
FIG. 6 is a flowchart depicting the operator service administration aspect of the present invention.

Referring now to FIG. 6, depicted is a flowchart demonstrating the operator service administration aspect of the present invention. FIG. 6 processing maintains data for records found in a database such as those shown in FIG. 3. The process starts in block 120, for example, as the result of invoking a program for maintaining the OSMT. Block 120 flows to block 122 which initializes the default operator action, and then on to block 124 which displays a scrollable list of current OSMT records and the current default operator action. Block 124 proceeds to block 126 which waits for user action in the user interface. In accordance with the preferred embodiment of the present invention, the user would be a phone company operator who maintains records in the OSMT at an operator console, a dial-in service, a networked personal computer, or the like. The term "maintains", as utilized herein, means to perform modifications such as modify, delete, add, view, display, etc. Upon detecting user action, if in block 128, the user selected to Exit, the process terminates in block 132. If in block 128, the user did not select to Exit, the user must have selected to maintain a record in the OSMT, or maintain the default operator action, in which case block 128 flows to block 130 for maintaining the selected record. Block 130 interfaces to the user for creating records, deleting records, browsing records or updating existing records of the OSMT. Block 130 also allows update of the default operator action. Block 100 then flows back to block 124 for processing as previously described. Thus, the OSMT can be maintained appropriately by a user interface.

Figure 7:
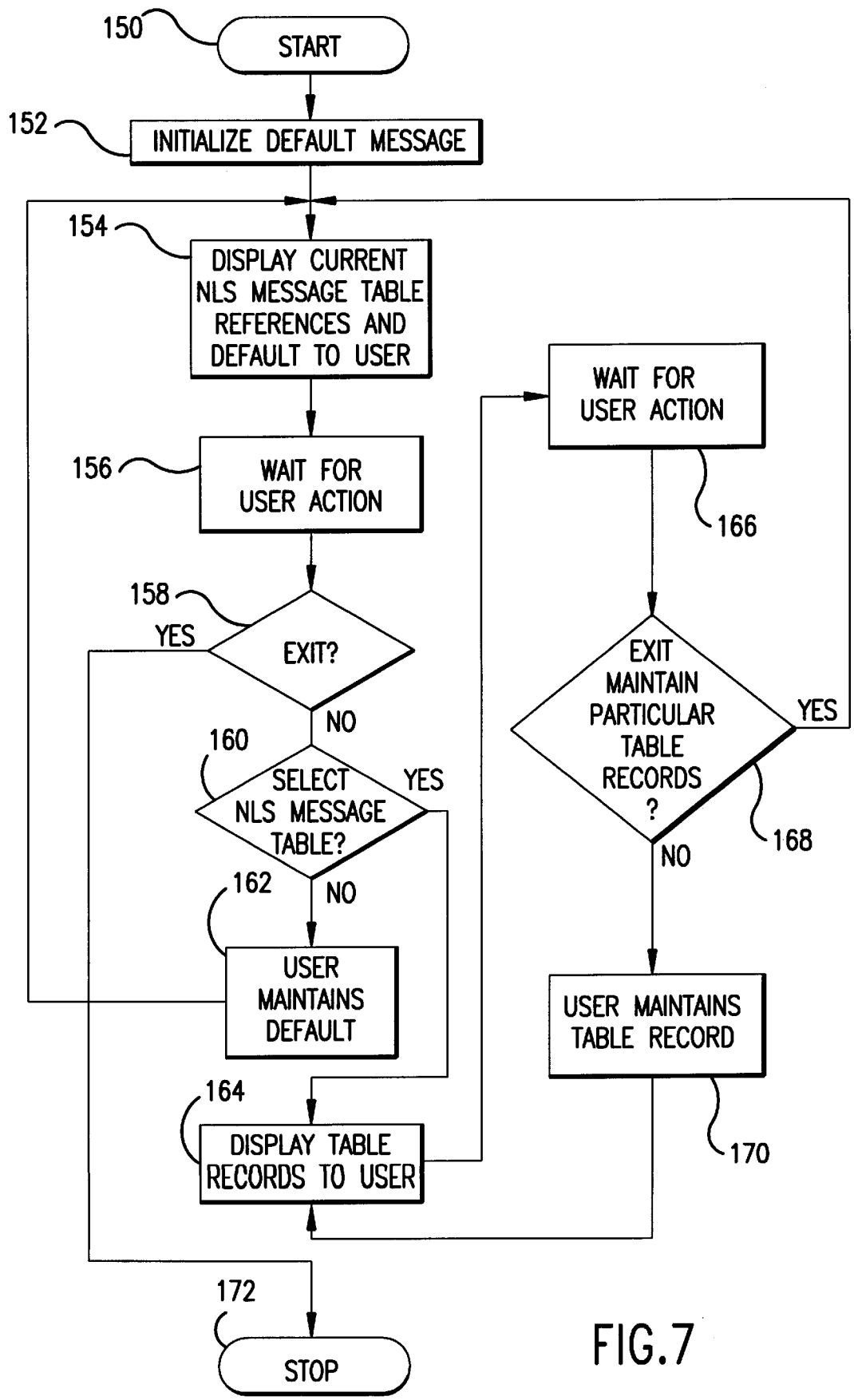
FIG. 7 is a flowchart depicting the error message administration aspect of the present invention.

With reference now to FIG. 7, depicted is a flowchart demonstrating the error message administration aspect of the present invention. FIG. 7 processing maintains data for records in a database, such as those found in FIG. 4. The term "maintains", as utilized herein, means to perform modifications such as modify, delete, add, view, display, etc. The process starts in block 150 as the result of invoking a program for maintaining the NMMAX described above. The process may or may not be integrated with the processing of FIG. 6. Block 150 proceeds to block 152 which initializes a default message. Block 152 flows to block 154 which displays a scrollable list of current NMMAX outermost variant NLS codes and the default message to the user. In accordance with the preferred embodiment of the present invention, the user would be a phone company operator who maintains records in the NMMAX at an operator console, a dial-in service, a networked personal computer, or the like. The NMMAX language code identifiers are preferably displayed as the corresponding human readable string values, for example, "US ENGLISH", "SPANISH", etc. Thereafter, block 156 waits for user action from the user interface.

Upon detecting user action, if the user selected to exit in block 158, then processing terminates in block 172. If in block 158, the user did not select to exit, block 160 seeks to determine which user action was performed. If in block 160, the user selected to modify the default error message, block 162 interfaces with the user for modifying the default message. Modification in block 162 includes recording a message, specifying a wave file reference, entering text for a subsequent text to speech process, entering a program reference, or specifying any means for transmitting a message to a connected telephone user. Block 162 allows the user to browse or play a current setting to determine if additional modification is necessary. Block 162 then flows back to block 154 for processing as previously described.

If in block 160, the user selected to maintain a particular language entry, block 164 displays for the selected language a scrollable list of current language maps between error codes and messages. For example, table 98 of FIG. 4 may be displayed. Thereafter, block 166 waits for further user action. Upon detecting user action, block 168 questions whether the user has selected to exit maintenance of the selected language mappings. If the answer in block 168 is yes then the process flows back to block 154 for processing as previously described. If the answer in block 168 is no, the user must have selected a row in a table, such as those in FIG. 4, so 168 flows to block 170. Block 170 provides an appropriate user interface for edit of the language mapping between error codes and associated means for playing an audible message to telephone users. Block 170 enables display or play of the current mapped messages, and enables modification of the mapped messages and error codes. Mapped entries, such as message 92 and its associated error code from FIG. 4, may be deleted, added, altered or browsed. Modification in block 170 includes recording a message, specifying a wave file reference, entering text for a subsequent text to speech process, entering a program reference, or specifying any means for transmitting a message to a connected telephone user. Block 170 then flows back to block 164 for processing as previously described.

Figure 8:
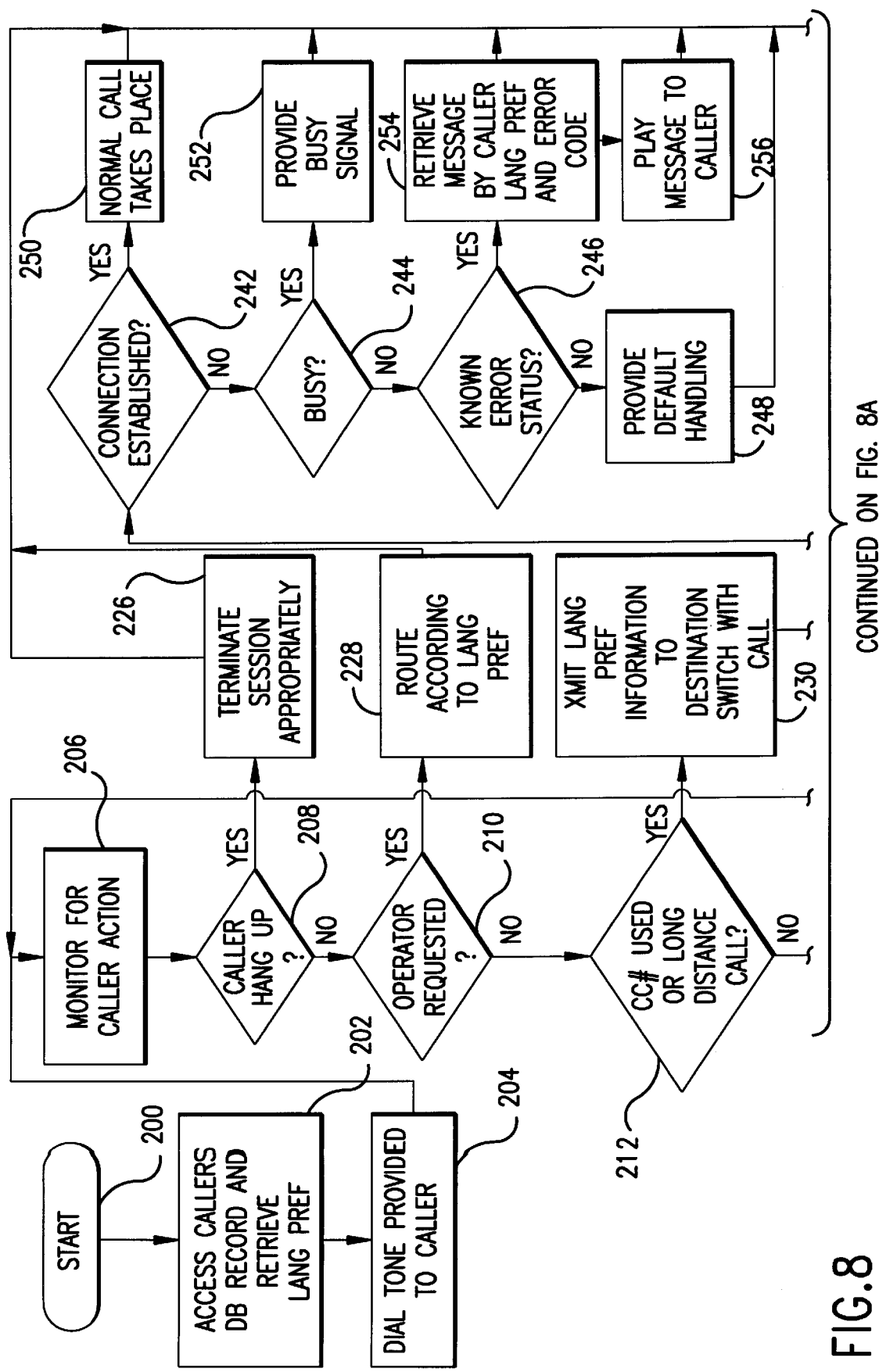
FIGS. 8 and 8A depict is a flowchart depicting the processing of a telephone call in accordance with the present invention.
Figure 8A:
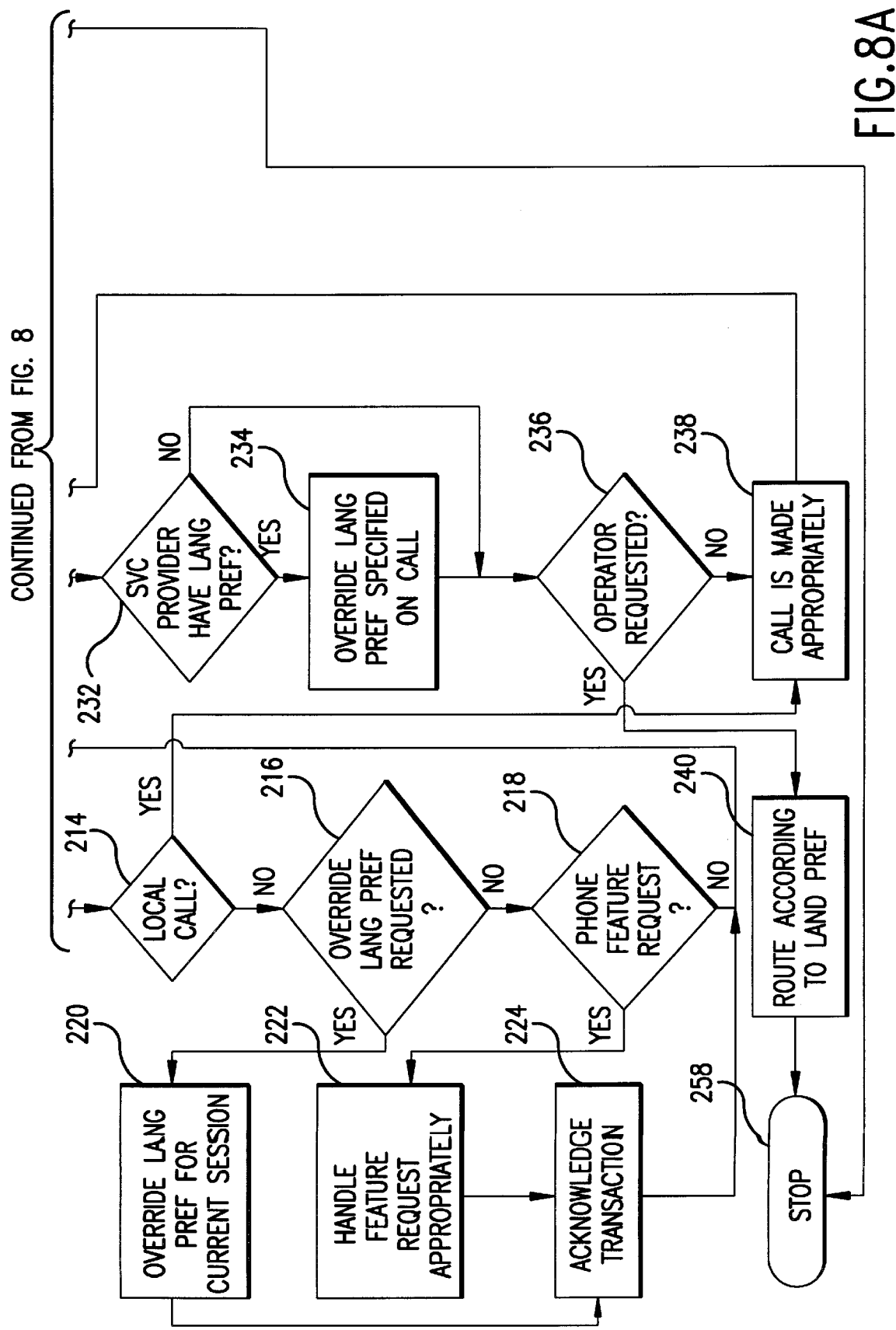

With reference now to FIGS. 8 and 8A, depicted is a flowchart demonstrating processing of telephone usage in accordance with the present invention. The process starts in block 200 upon a telephone user, referred to hereinafter as a user, preparing to make a telephone call by initiating protocol for dial tone. Block 200 flows to block 202 where the user's customer record, such as depicted in FIG. 2, is accessed from a database to determine the language preference indicator for that user. Block 202 sets a local variable to the language preference indicator. The local variable facilitates transmission of the language preference indicator with a phone call so that the call can be processed in accordance with the associated language preference indicator. All databases used by the present invention may be stored at any system within a network with which the above processes are communicating at a level of satisfactory performance. Databases may be accessed at various opportune moments throughout FIGS. 8 and 8A processing without departing from the spirit and scope of the invention.

Block 202 proceeds to block 204 where dial tone is delivered to the users telephone. Thereafter, block 206 monitors the telephone line (i.e. active session) for user action, for example, the detection of Dual Tone Modulation Frequencies (DTMFs). If in block 208, the user hangs up the phone, block 226 properly terminates the telephone session at the EO and all processing is terminated in block 258. If the user did not hang up the phone in block 208, the process continues to block 210 to determine if the user requested an operator.

If the user requested a local operator, for example, by pressing the 0 button on a touch-tone telephone, processing flows to block 228. Block 228 operates by accessing a database, such as the OSMT depicted in FIG. 3, and comparing the users language preference indicator to the OSMT, so as to determine a corresponding operator action. If no entry in the OSMT matches the language preference indicator, a default operator action is used. If there is a match, the operator action determined for the user's language preference is invoked. Regardless of the operator action invoked (operator extension, operator full phone number or service executable), the call is appropriately forwarded and block 228 proceeds to block 258.

Referring back to block 210, if an operator was not requested, processing continues to block 212. If in block 212, the user dialed a calling card number or placed a long distance call, the process shifts to block 230 so as to transmit the language preference indicator with the call to the destination switch. The language preference indicator information and protocol therefor may be transmitted in band or out of band. These transmission methods are well known to those skilled in the art.

Block 230 proceeds to block 232. If in block 232, the calling card service provider or long distance carrier, such as an IXC, also maintains a language preference for the same user, then block 234 overrides the current language preference indicator with the new (IXC) setting. The new (IXC) setting may or may not be the same language preference indicator associated with the telephone call from the EO. Block 234 continues to block 236. If in block 232, the calling card service provider did not contain a language preference indicator for the user, block 232 flows to block 236 directly, thereby using the EO language preference indicator. Since an IXC may or may not be enabled to support a language preference, the IXC will utilize any indicator provided accordingly. For example, if target switches do not support the language preference feature, they will simply ignore the data.

If in block 236, an operator was requested, such as part of the calling card number or long distance dialing process, block 240 would access a database, such as the OSMT of FIG. 3, and compare the user's language preference indicator to the OSMT to retrieve the corresponding operator action. If no entry matches the language preference indicator, a default operator action is used. Regardless of the operator action invoked (operator extension, operator full phone number or service executable), the call is appropriately forwarded. Block 240 then proceeds to block 258 which terminates. Note that block 240 performs like block 228 except that block 240 processes in an IXC environment and block 228 processes in an EO environment.

Referring back to block 236, if the user directly dialed the destination without requesting operator assistance, block 236 continues to block 238, where the call is placed. Thereafter, processing monitors the status of the call for successful completion. If in block 242, the connection is established, a normal call takes place in block 250 and processing terminates in block 258. If in block 242, the call did not successfully connect, block 242 flows to block 244. If in block 244, the call reached a busy status, block 244 flows to block 252 to provide a busy signal consistent with existing art, and then on to block 258 where processing terminates. If in block 244, the call did not reach a busy status, block 244 continues to block 246. If in block 246, the error status associated with the call is not known, block 248 provides default handling of the error status, for example a default audible signal or message. Block 248 then continues to block 258 which terminates processing. If in block 246, the error status is known, block 254 determines the correct handling of the error status. Block 254 accesses a database, such as the NMMAX of FIG. 4, and the error code and telephone user's language preference indicator are compared to retrieve the corresponding message. If no entry matches, a default message is used. Upon retrieval of the appropriate message information in block 254, block 256 ensures play of the message to the user. Block 256 then proceeds to block 258 which terminates processing.

Referring back to block 212, if a calling card number or long distance call was not requested by the user, block 212 flows to block 214. If in block 214 a local call was dialed, block 214 proceeds to block 238 for processing as previously described. Block 238 and subsequent processing would follow the same implementation, regardless of whether in an EO or IXC environment. If in block 214, the user did not place a local call, block 214 flows to block 216. If in block 216, the user action was to override any language preference indicator associated with the current telephone call, block 220 overrides the language preference indicator for the current phone call only. The local language preference indicator variable is set for transmission with the phone call. An alternative embodiment may enable setting the language preference field in the OSMT of the EO. Block 220 continues to block 224, which acknowledges the user's request with a signal so that the user knows the language preference command was successfully accepted for the current call. Thereafter, processing continues back to block 206 for monitor of further user action.

If in block 216, a language preference command was not overridden, the process flows to block 218. If in block 218, a phone feature command was requested (e.g., call forwarding), block 222 performs the feature request and block 224 provides an acknowledgment thereto. Thereafter, processing continues back to block 206 to monitor further user action. Note that blocks 216, 218, 220, 222 and 224 behave consistent with current phone feature handling. For example, call forwarding may be requested by dialing *72 on a touch-tone phone, followed by the destination number. A language preference command may be specified by dialing *91 on a touch-tone phone, followed by a language preference indicator value defined similarly to values found in the OSMT and NMMAX. Block 224 provides a distinguishable number of tones indicating an error or success. If in block 218, no feature request was detected, processing continues back to block 206. Also note that block 206, 208, 210, 212, 214, 216 and 218 form a monitoring loop for user activity on a telephone call.

It should be appreciated that a language preference indicator would be usable by any telephone connected, automated service so as to tailor the language of the automated service to the user. The operator action is any automatically performed action for a telephone call which would otherwise require a human operator. Various embodiments within the scope of the present invention include an operator action specification for a parameter list to a shared program, or the setting of arguments which will affect subsequent execution of a process which handles the telephone call. In accordance with the present invention, operators, error messages, third party switches (e.g. PBX), answering services, or the like, will automatically adapt to the preferred language of a user.

An alternative embodiment would be to utilize multiple fields in a customer record (instead of a single language preference field) to establish the language preference indicator value thereof. That method of definition would be appropriately reflected in the OSMT, NMMAX and remaining present invention processing.

While the invention has been particularly shown and described with reference to a preferred embodiment, it will be understood by those skilled in the art that various changes in form and detail may be made therein without departing from the spirit and scope of the invention.

What is claimed is:

1. A method for automatically enabling language support within a telecommunications system, comprising the steps of:

associating a language preference indicator of a customer record with a telephone call being managed by said telecommunications system, wherein said language preference indicator is previously selected by a customer from among a plurality of language preference indicators, said step of associating said language preference indicator with said telephone call made by said customer comprising the steps of:

detecting telephone off hook status of said customer;

comparing the telephone number of said customer to the telephone number in said customer record;

retrieving said language preference indicator from said customer record; and maintaining said language preference indicator with said telephone call as said telephone call is managed by said telecommunication system;

comparing said language preference indicator to a language support database to determine an action to be performed by said telecommunications system that affects the management of said telephone call; and managing said telephone call in accordance with said action.

2. The method of claim 1, wherein the step of associating a language preference indicator with a telephone call made by a customer further comprises the steps of:

detecting a request from said customer to set said language preference indicator;

saving said language preference indicator as specified by said customer for use within said telecommunications system; and maintaining said language preference indicator with said telephone call as said telephone call is managed by said telecommunications system.

3. The method of claim 1, wherein the step of associating a language preference indicator with a telephone call made by a customer further comprises the step of overriding a first language preference indicator associated with said telephone call with a second language preference indicator selected by a customer.

4. The method of claim 3, wherein the step of overriding includes the step of overriding an end office originated language preference indicator with an interexchange carrier originated language preference indicator.

5. The method of claim 1, wherein the step of managing said telephone call further comprises the steps of:

retrieving said action from a service configuration of said language support database; and managing said telephone call by automatically routing said telephone call in accordance with said action.

6. The method of claim 1, wherein the step of managing said telephone call further comprises the steps of:

detecting that said telephone call is an unsuccessful call;

retrieving an error message from an error message configuration of said language support database corresponding to said unsuccessful call; and responding to said telephone call with said error message.

7. A telecommunications system including a network for automatically enabling preferential language support for customer telephone calls, comprising:

one or more computer systems for controlling said telecommunications system;

one or more storage devices for storing customer data and system data;

a data record within one of said one or more storage devices for associating a language preference indicator with a customer telephone call, wherein said language preference indicator is selected by a customer from among a plurality of language preference indicators;

a language support database within one of said one or more storage devices for defining actions to be performed by said telecommunications system, said actions corresponding to said language preference indicator; and means for responding to said customer telephone call in accordance with an action retrieved from said language support database, said means further comprising means for detecting off-hook status of a customer telephone for setting said language preference indicator.

8. The telecommunications system of claim 7, further comprising means for maintaining said data record.

9. The telecommunications system of claim 7, further comprising means for maintaining said language support database.

10. The telecommunications system of claim 7, wherein said means for responding to said customer telephone call in accordance with an action retrieved, further comprises means for responding to said off-hook status in accordance with an action retrieved from said language support database corresponding to said request.

11. The telecommunications system of claim 7 further comprising means for overriding a first language preference indicator associated with said customer telephone call with a second language preference indicator selected by a customer.

12. The telecommunications system of claim 11, wherein said means for overriding includes means for overriding an end office originated language preference indicator with an interexchange carrier originated language preference indicator.

13. The telecommunications system of claim 7, wherein means for responding to said telephone call in accordance with an action retrieved from said language support database further comprises:

means for retrieving said action from a service configuration of said language support database; and means for managing said telephone call by automatically routing said telephone call in accordance with said action.

14. The telecommunications system of claim 7, wherein said means for responding to said telephone call in accordance with an action retrieved from said language support database further comprises:

means for detecting that said telephone call is an unsuccessful call;

means for retrieving an error message from an error message configuration of said language support database corresponding to said unsuccessful call; and means for responding to said telephone call with said error message.

* * * * *